Patented Jan. 10, 1928.

1,656,091

UNITED STATES PATENT OFFICE.

VICTOR YNGVE, OF SOUTH ORANGE, NEW JERSEY, AND CHARLES G. BIRDSALL, OF ELMHURST, NEW YORK, ASSIGNORS, BY MESNE ASSIGNMENTS, TO NATIONAL CARBON COMPANY, INC., OF NEW YORK, N. Y., A CORPORATION OF NEW YORK.

DEPOLARIZING MIX FOR DRY CELLS.

No Drawing. Application filed March 24, 1924. Serial No. 701,575.

This invention relates to a method of compacting the depolarizing mix of dry cells, and more particularly to improvements on the method described in a copending application of W. F. Hendry, Serial No. 654,611, dated July 30, 1923.

In accordance with the method described in the above mentioned application the depolarizing mix of a dry cell is put up in the form of tablets which are compacted of dry materials. We have found that by slightly moistening the mix before it is compacted the speed of the compacting press may be materially increased as compared with the speed that is practicable in compacting a dry mix. The amount of moisture to be used depends on the speed of the press, the fineness of the material, the relative proportions of depolarizing and carbonaceous material used, and the amount of added salts. We have found that, generally, best results are obtained with a moisture content of 3 to 9%.

In accordance with the preferred embodiment of the present invention, manganese dioxide and carbon are mixed together in granular form with electrolytic salts. Then either water or a solution containing zinc chloride or ammonium chloride, together with other salts are added. During the addition of the liquid the material should be continuously stirred until it begins to granulate. If the mixture is found to contain more than the necessary amount of moisture, it is dried out at a temperature under 140° F., to evaporate the excess moisture. The mixture may now be again granulated in a suitable mill, whereupon it will be in condition to be fed into the tablet-making die.

The following are typical examples of the moisture content of these materials. For a mixture containing four parts of manganese to one part of graphite of such a degree of fineness that 98% passes through 200 mesh, the moisture content should be from 3% to 6%. For a mixture of three parts of manganese to one part of graphite, 95% of which passes through 200 mesh, the moisture content should be from 5% to 7%. For material composed of three parts of manganese to one part of graphite, 50% of which passes through 200 mesh, the moisture may be from 7% to 9%.

Obviously, the above proportions may be varied depending on the requirements of particular cases, but the moisture content of the mixture should be not less than 3% or more than 9%.

What we claim is:

1. The method of compacting tablets of depolarizing mixture which consists in mixing depolarizing and carbonaceous materials, moistening the mixture sufficiently to form a non-plastic composition when the mixture is compressed and formed into a self-sustaining structure and then compressing it into tablets.

2. The method of compacting tablets of depolarizing mixture which consists in mixing depolarizing and carbonaceous materials, adding from 3 to 9% of liquid, and then compressing the mixture into tablets.

3. The method of compacting tablets of depolarizing mixture which consists in mixing manganese dioxide and graphite with electrolytic salts and from 3 to 9% of water, and then feeding the mixture in a granulated form into the tablet-making machine.

4. The method of compacting tablets of depolarizing mixture which consists in moistening depolarizing and carbonaceous materials, drying the mixture until its liquid content is reduced to from 3 to 9%, granulating the mixture, and then feeding it into the tablet-making machine.

In testimony whereof, we have signed our names to this specification this 20th day of March, 1924.

VICTOR YNGVE.
CHARLES G. BIRDSALL.